United States Patent

Ehrenberg et al.

[11] Patent Number: 6,124,441
[45] Date of Patent: Sep. 26, 2000

[54] MONOASO COMPOUNDS CONTAINING A FLUORO-TRIAZINYL GROUP LINKED WITH A FIBER-REACTIVE GROUP OF THE VINYL SULFONE SERIES VIA AN ETHYL-N-METHYLY-AMINO GROUP, SUITABLE AS DYESTUFFS

[75] Inventors: Stefan Ehrenberg, Frankfurt am Main; Karl-Josef Herd, Odenthal, both of Germany

[73] Assignee: DyStar Textilfarben GmbH & Co. Deutschland KG, Germany

[21] Appl. No.: 09/290,152

[22] Filed: Apr. 13, 1999

[30] Foreign Application Priority Data

Apr. 15, 1998 [DE] Germany .......................... 198 16 553

[51] Int. Cl.[7] ...................... C09B 62/085; C09B 62/008; C09B 62/51; D06P 1/38
[52] U.S. Cl. .......................... 534/638; 534/617; 534/640
[58] Field of Search .................................... 534/640, 638, 534/617

[56] References Cited

U.S. PATENT DOCUMENTS

| | | | |
|---|---|---|---|
| 5,324,329 | 6/1994 | Washimi et al. | 8/543 |
| 5,459,245 | 10/1995 | Jaeger | 534/635 |
| 5,459,246 | 10/1995 | Jaeger | 534/635 |

FOREIGN PATENT DOCUMENTS

| | | | |
|---|---|---|---|
| 0499588 | 8/1992 | European Pat. Off. | 534/640 |
| 557 841 | 9/1993 | European Pat. Off. . | |
| 569 779 | 11/1993 | European Pat. Off. . | |
| 576 026 | 12/1993 | European Pat. Off. . | |

*Primary Examiner*—Floyd D. Higel
*Attorney, Agent, or Firm*—Connolly Bove Lodge & Hutz LLP

[57] ABSTRACT

Described are fiber-reactive, water-soluble monoazo compounds which conform to the hereinbelow indicated and defined general formula (1) and which are capable of dyeing hydroxy- and/or carboxamido-containing material, especially fiber material, such as cellulose fibers, for example cotton or regenerated cellulose fibers, and also wool and synthetic polyamide fibers in high color strength and good fastnesses.

(1)

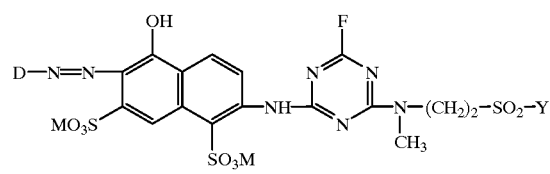

where M is hydrogen, an alkali metal or some other salt-forming, colorless metal, D is a 2-sulfophenyl radical which may be additionally substituted by alkyl of 1 to 4 carbon atoms, alkoxy of 1 to 4 carbon atoms, sulfo and/or carboxy or is a 1-sulfonaphth-2-yl radical which may be additionally substituted by sulfo and/or carboxy, and the group $-SO_2-Y$ is a fiber-reactive group of the vinyl sulfone series.

15 Claims, No Drawings

MONOASO COMPOUNDS CONTAINING A FLUORO-TRIAZINYL GROUP LINKED WITH A FIBER-REACTIVE GROUP OF THE VINYL SULFONE SERIES VIA AN ETHYL-N-METHYLY-AMINO GROUP, SUITABLE AS DYESTUFFS

This invention relates to the technical field of fiber-reactive dyes.

Dyes having fiber-reactive properties are widely used for dyeing and printing textile fiber materials. Although a large number of useful fiber-reactive dyes having different properties are available for various areas of application, the state of technology achieved is frequently not fully satisfactory in the light of the high requirements with regard to suitability for certain dyeing processes and the fastness level of the dyeings. There is therefore an urgent need for further improved fiber-reactive dyes.

It is an object of the present invention to provide novel orange- to scarlet-dyeing fiber-reactive dyes which possess a high degree of fixation and also good washfastnesses, especially good washoff characteristics with regard to unfixed dye portions on the dyeings and possess a high solubility.

The present invention achieves this object by providing the hereinbelow indicated and defined monoazo compounds of the general formula (1).

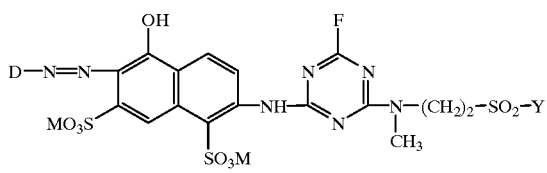

(1)

In the formula (1):

M is hydrogen or an alkali metal, such as sodium, potassium or lithium, or some other salt-forming colorless metal, such as the equivalent of an alkaline earth metal, preferably hydrogen or an alkali metal;

D is a group of the general formula (2a) or (2b)

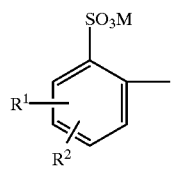

(2a)

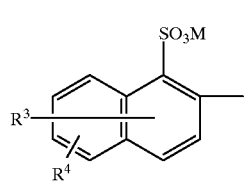

(2b)

where

M is as defined above, $R^1$ is hydrogen, alkyl of 1 to 4 carbon atoms, such as ethyl and especially methyl, or alkoxy of 1 to 4 carbon atoms, such as ethoxy and especially methoxy, and preferably hydrogen, methyl, methoxy or ethoxy, $R^2$ is hydrogen, sulfo or carboxy, preferably hydrogen or sulfo, $R^3$ is hydrogen or sulfo, and $R^4$ is hydrogen, sulfo or carboxy, preferably hydrogen or sulfo, Y is vinyl or is ethyl which is substituted in the β-position by an alkali-eliminable substituent, for example chlorine, thiosulfato, phosphate, sulfato, acetyloxy and sulfobenzoyloxy, and is preferably vinyl or β-sulfatoethyl.

In the foregoing general formulae and also in the subsequent general formulae, the individual elements of the formulae, whether they bear identical or different designations within any one general formula, can have meanings under their definition which are mutually identical or different.

The terms "sulfo", "thiosulfato", "carboxy", "phosphate" and "sulfato" cover not only the acid form but also the salt form of the respective groups. Accordingly, sulfo groups are groups conforming to the general formula —$SO_3M$, thiosulfato groups are groups conforming to the general formula —S—$SO_3M$, carboxy groups are groups conforming the general formula —COOM, phosphato groups are groups conforming to the general formula —$OPO_3M_2$, and sulfato groups are groups conforming to the general formula —$OSO_3M$, where each M is as defined above.

Examples of D are 2-sulfophenyl, 2,5-disulfophenyl, 2,4-disulfophenyl, 2-sulfo-5-methylphenyl, 2-sulfo-4-methoxyphenyl, 2-sulfo-4-methylphenyl, 2-sulfo-5-methoxyphenyl, 2,5-disulfo-4-methoxyphenyl, 1,5,7-trisulfonaphth-2-yl, 1,7-disulfonaphth-2-yl, 1,6-disulfonaphth-2-yl, 1-sulfonaphth-2-yl and 1,5-disulfonaphth-2-yl, preferably 4-methoxy-2-sulfophenyl and 1,5-disulfo-naphth-2-yl.

The present invention further provides processes for preparing the azo compounds of the general formula (1) according to the invention, which comprise coupling a diazonium salt of an aromatic amine of the general formula D—$NH_2$, where D is as defined in claim 1, with a compound of the general formula (3)

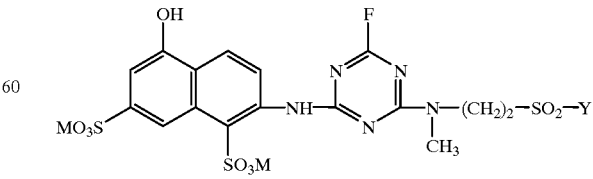

(3)

where M and Y are each as defined in claim 1, or reacting a compound of the general formula (4)

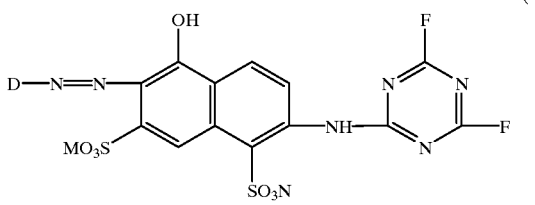

where D and M are each as defined in claim 1, with a compound of the general formula (5)

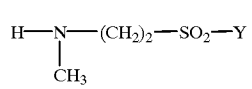

where $Y^1$ is ethyl which is substituted in the β-position by an alkali-eliminable substituent, for example chlorine, thiosulfato, phosphate, sulfato, acetyloxy and sulfobenzoyloxy, and preferably is β-sulfatoethyl, and optionally converting the resulting compound by the action of an alkali at a pH between 9 and 11 and at a temperature between 0 and 15° C. into the compound of the general formula (1) where is Y vinyl.

The synthesis of the monoazo compounds of the invention by reaction of a diazonium salt with an amine of the general formula D—NH$_2$ with a compound of the general formula (3) is effected according to the customary procedures of a coupling reaction, for example at a pH between 3 and 8.5, preferably between 4 and 7.5, and at a temperature between 0 and 30° C., preferably between 5 and 25° C., in an aqueous medium. The diazotization of the starting compound of the general formula D—NH$_2$ is effected in a conventional manner by means of nitrous acid, for example by means of sodium nitrite in aqueous hydrochloric acid or sulfuric acid, at a temperature between −10° C. and +15° C. and at a pH of less than 2.5.

The reaction of a compound of the general formula (4) with a compound of the general formula (5) is effected analogously to known procedures of a reaction of fluorotriazine compounds with an amino compound in suspension or solution in an aqueous or aqueous organic medium. The same applies to the preparation of the starting compound of the general formula (3), preferably through the reaction of a compound of the general formula (6) by reacting 2-amino-5-hydroxynaphthalene-1,7-disulfonic acid with 2,4,6-trifluoro-1,3,5-triazine (cyanuric fluoride) in the pH range from 2 to 6, preferably from 3 to 5, and at temperatures of −5° C. to +20° C., especially of 0 to 5° C., optionally in the presence of a buffer, to obtain the difluoro compound. The subsequent reaction with an amine of the general formula (5) is generally effected at a temperature between 0 to 15° C., preferably at a temperature between 0 to 10° C., and at a pH between 5.0 and 8.0, preferably between 6.0 and 7.0.

As regards the reaction of compounds of the general formula (3), (4) and (5), care must be taken to ensure that the fiber-reactive groups are not damaged in the alkaline range.

The separation from their synthesis batches of the azo compounds of the general formula (1) prepared according to the present invention is effected by commonly known methods either by precipitating from the reaction medium by means of electrolytes, for example sodium chloride or potassium chloride, or by evaporating the reaction solution, for example by spray drying, in which case this reaction solution may have a buffer substance added to it.

The monoazo compounds of the general formula (1) are useful for dyeing and printing hydroxy- and amido-containing materials, especially cellulose fiber materials. They are notable for a high reactivity and a high degree of fixation. The dyeings and prints on cellulose fiber materials obtainable with the monoazo compounds of the present invention are notable for a high fiber-dye bond stability, good wetfastnesses and also for excellent stability to oxidizing agents, such as peroxide- or chlorine-containing laundry detergents. The washoff characteristics of the hydrolysis products, which are formed only to a minor extent in the dyeing or printing, is excellent.

The Examples hereinbelow serve to illustrate the invention. Parts and percentages are by weight, unless otherwise stated. Parts by weight relate to parts by volume as the kilogram relates to the liter.

The compounds described in the Examples in terms of a formula are indicated in the form of the free acids; in general, they are prepared and isolated in the form of their alkali metal salts, such as lithium, sodium or potassium salts, and used for dyeing in the form of their salts. The starting compounds and components mentioned in the following Examples, especially Table Examples, in the form of the free acid can similarly be used in the synthesis as such or in the form of their salts, preferably alkali metal salts.

The visible region absorption maximum ($\lambda_{max}$) reported for the dyes of the invention were determined in aqueous solution with reference to their alkali metal salts. In the Table Examples, the $\lambda_{max}$ values appear in parentheses following the reported hue; the reported wavelength is in nm.

EXAMPLE 1 a) About 200 parts of a neutral (pH 7) aqueous solution comprising 31.9 parts of 2-amino-5-hydroxynaphthalene-1,7-disulfonic acid are admixed with 200 parts of ice and 2.2 parts of sodium fluoride. 11 parts by volume of 2,4,6-trifluoro-1,3,5-triazine (cyanuric fluoride) are rapidly added with stirring. The batch is subsequently stirred for a further five minutes and then admixed with 27.2 parts of N-methyl-N-[β-(β'-sulfatoethylsulfonyl)-ethyl]-amine, adjusted to a pH between 6.5 and 7.0 with 20% strength aqueous sodium carbonate solution and maintained at a reaction temperature of 5 to 10° C.; the reaction ends after about 30 minutes.

b) To the monofluorotriazine compound thus prepared, which serves as coupling component, is added a diazonium salt suspension conventionally prepared from 30.3 parts of 1,5-disulfo-2-aminonaphthalene in 200 parts of water using 30 parts by volume of concentrated aqueous hydrochloric acid and 20 parts by volume of an aqueous 5N sodium nitrite solution, while the pH of the reaction batch is held at a pH between 6.5 and 7.0 at the same time by means of 20% strength aqueous sodium carbonate solution and the coupling reaction being carried out at a temperature of about 15° C.

After the coupling has ended, the azo compound according to the invention, having the formula (written in the form of the free acid)

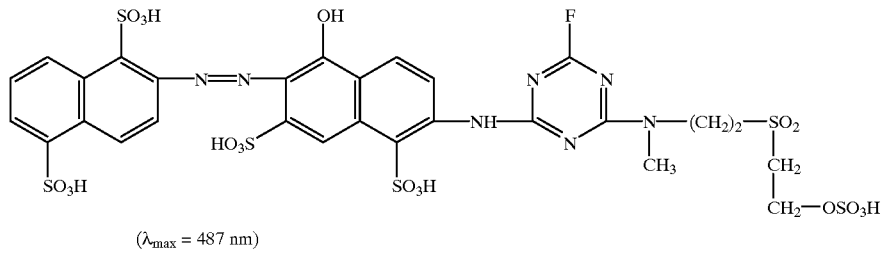

($\lambda_{max}$ = 487 nm)

is salted out by means of sodium chloride and isolated. It possesses useful fiber-reactive dye properties and dyes the materials mentioned in the description, for example cotton, by the application processes customary in the art of fiber-reactive dyes, in brilliant orange shades having good fastness properties, of which the washfastnesses are especially noteworthy.

EXAMPLE 2

Example 1a) is repeated to prepare the coupling component and this coupling component is admixed, in the aqueous reaction batch prepared, with a conventionally prepared diazonium salt solution from 20.3 parts of 2-sulfo-4-methoxy-aniline; during the addition of the diazonium salt compound a pH between 6.5 and 7.0 is simultaneously maintained with 20% strength aqueous sodium carbonate solution while the coupling temperature is maintained at 10 to 15° C., and the batch is subsequently stirred for a while longer under these reaction conditions.

The monoazo compound formed is according to the invention and has the formula (written in the form of the free acid)

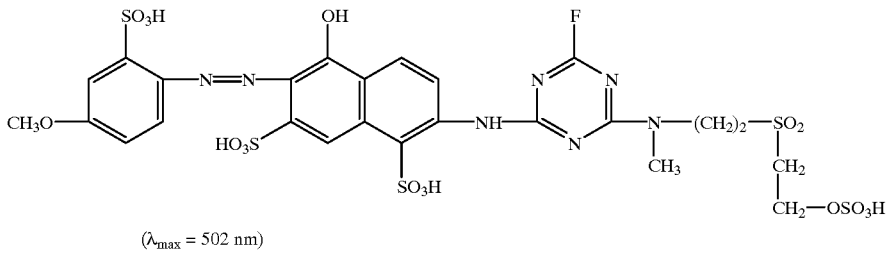

($\lambda_{max}$ = 502 nm)

and is isolated in a conventional manner as alkali metal salt, such as sodium salt, for example by said salting out with sodium chloride. The azo compound of the invention possesses very good dye properties and dyes cellulose fiber materials, such as cotton, in brilliant scarlet shades by the dyeing processes customary in the art of fiber-reactive dyes.

EXAMPLE 3

Example 1a) is repeated to synthesize the coupling component and this coupling component is coupled under the reaction conditions indicated in Example 1b) with the diazonium salt of 2-sulfo-4-methylaniline. After the coupling reaction has ended, the reaction batch is adjusted to pH 11 and further stirred for about 60 minutes at a temperature of 0 to 5° C. while this pH is maintained.

The azo compound of the invention, which has the formula (written in the form of the free acid)

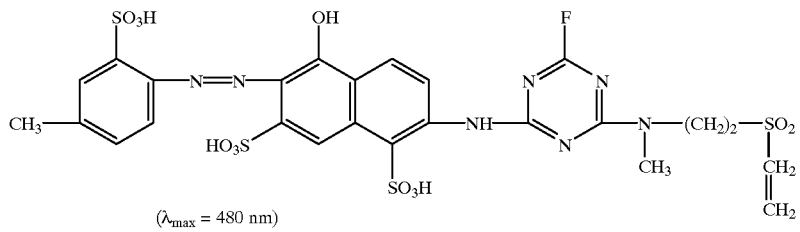

($\lambda_{max}$ = 480 nm)

is isolated in a conventional manner; it dyes cotton, for example, in brilliant orange shades by the customary application processes.

What is claimed is:

1. A monoazo compound of the formula (1)

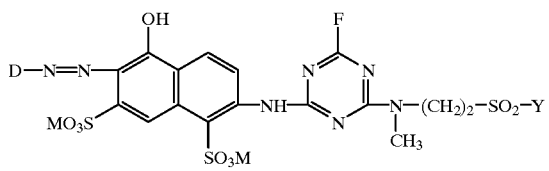

(1)

where

M is hydrogen or an alkali metal;

D is a group of the formula (2a) or (2b)

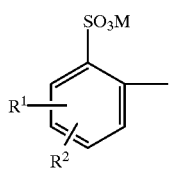

(2a)

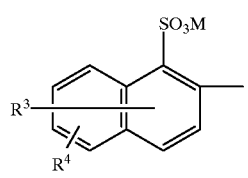

(2b)

where

M is as defined above, $R^1$ is hydrogen, alkyl of 1 to 4 carbon atoms or alkoxy of 1 to 4 carbon atoms, $R^2$ is hydrogen, sulfo or carboxy, $R^3$ is hydrogen or sulfo, and $R^4$ is hydrogen, sulfo or carboxy;

Y is vinyl or is ethyl which is substituted in the β-position by an alkali-eliminable substituent selected from the group consisting of chlorine, thiosulfato, phosphato, sulfato, acetyloxy and sulfobenzoyloxy.

2. The monoazo compound of claim 1, wherein D is a group of the formula (2a) mentioned and defined in claim 1.

3. The monoazo compound of claim 2, wherein $R^2$ is hydrogen.

4. The monoazo compound of claim 1, wherein D is a group of the formula (2b) mentioned and defined in claim 1.

5. The monoazo compound of claim 1, wherein D is 2-sulfo-4-methoxy-phenyl.

6. The monoazo compound of claim 1, wherein D is 1,5-disulfonaphth-2-yl.

7. The monoazo compound of claim 1, wherein Y is β-sulfatoethyl or vinyl.

8. The monoazo compound of claim 1, wherein Y is β-sulfatoethyl.

9. The monoazo compound of claim 1, wherein M is an alkali metal.

10. A process for dyeing hydroxy- or carboxamido-containing material which comprises applying a dye which comprises the monoazo compound of claim 1, to the material and fixing the dye on the material by means of (1) heat, (2) with the aid of an alkaline agent or (3) by means of heat and with the aid of an alkaline agent.

11. The process of claim 10, wherein the material is a fiber material.

12. Monoazo compound as claimed in claim 5 wherein Y is β-sulfatoethyl.

13. Monoazo compound as claimed in claim 6 wherein Y is β-sulfatoethyl.

14. Monoazo compound as claimed in claim 12 wherein M is an alkali metal.

15. Monoazo compound as claimed in claim 13 wherein M is an alkali metal.

* * * * *